United States Patent
Shimaya et al.

[11] Patent Number: 5,966,921
[45] Date of Patent: Oct. 19, 1999

[54] TIMING CHAIN WITH TIMING MARKS AND METHOD OF MANUFACTURING THE SAME

[75] Inventors: Kazuhiko Shimaya, Hidaka; Arimasa Kaga, Tokyo-to, both of Japan

[73] Assignee: Tsubakimoto Chain Co., Osaka, Japan

[21] Appl. No.: 09/099,770

[22] Filed: Jun. 19, 1998

[30] Foreign Application Priority Data

Jan. 23, 1998 [JP] Japan .................................. 10-010975

[51] Int. Cl.⁶ ........................................................ B21L 9/06
[52] U.S. Cl. .......................................... 59/5; 59/9; 59/35.1
[58] Field of Search .............................. 59/4, 5, 35.1, 78, 59/9

[56] References Cited

U.S. PATENT DOCUMENTS 4,354,344 10/1982 Yagi .......................................... 59/35.1

FOREIGN PATENT DOCUMENTS

| 0 357 511 | 3/1990 | European Pat. Off. . |
| 43 39 321 A1 | 6/1994 | Germany . |
| 9-242829 | 9/1997 | Japan . |
| 022313 | 9/1897 | United Kingdom ..................... 59/35.1 |

*Primary Examiner*—David Jones
*Attorney, Agent, or Firm*—Armstrong, Westerman, Hattori, McLeland and Naughton

[57] ABSTRACT

In order to provide a timing mark at a specific place on part of a timing chain in a manner in which the quality of the timing chain is maintained, a timing chain 4, made endless by outer plates 1 and inner plates 2 being connected by means of connecting pins 3 is provided with a timing mark 1' at a specific part on one side of an outer plate 1. The timing mark 1' is placed on the outer plate 1 between the connecting pins 3 and is in the shape of a web extending from an inner edge of the outer plate 1 to an outer edge thereof. The timing mark 1' is provided by baking a coating on the outer plate 1 after the timing chain has been assembled.

4 Claims, 4 Drawing Sheets

TIMING CHAIN WITH TIMING MARKS AND METHOD OF MANUFACTURING THE SAME

BACKGROUND OF THE INVENTION

The present invention relates to a timing chain wound between members which require a synchronous rotation. The timing chain of the present invention is wound, for example, between a crank sprocket and a cam sprocket of an engine for a vehicle, and is used for the synchronous rotation of a crank shaft with a cam shaft. Alternatively, the timing chain of the present invention can be wound between a crank sprocket and a balancer sprocket of an engine for a vehicle, and used for the synchronous rotation of a crank shaft with a balancer shaft.

A timing chain used for the synchronous rotation as mentioned above typically employs a sprocket having timing marks and a timing chain having timing marks. The timing marks are made to register when the timing chain is wound about the sprocket for achieving the synchronous rotation.

Incidentally, generally, the timing marks of the timing chain are provided by a method in which some marks are imposed on a single plate prior to construction of the timing chain. There is a further method of applying some marks to the timing chain by a plating treatment to provide timing marks. In this method, however, because gases generated during the plating treatment, for example, hydrogen, should be removed, and addition of a baking treatment is necessary to prevent the lowering of fatigue strength, the process management should naturally be severe, and the production efficiency is extremely bad.

The applicant has previously proposed a timing chain applied with timing marks by a color baking coating as disclosed in Japanese Patent Laid-Open No. 242829/1997. In this timing chain, timing marks obtained by the color baking coating are applied to outer plates of a part composing the timing chain, which is composed endlessly together with other plates.

However, according to these prior art practices the outer plates having timing marks are prepared via a manufacturing process separately from other outer plates. Therefore, it is necessary to store, as stock, outer plates having timing marks and outer plates having no timing marks for every type of timing chain. This poses a problem in that many steps for managing parts constituting the timing chain are necessary, and the securing of storage areas for the respective parts is very wasteful.

Further, since coated outer plates are assembled with other plates, the coated outer plates have to be incorporated into the specific parts in the midst of construction of the timing chain. Normally, the specific parts are positioned on one side of the timing chain though different according to the type of the timing chain, and are positioned at two places in the chain. Accordingly, when the timing chain is constructed, it is necessary to specify the surface and back of the timing chain, as well as to specify the predetermined position in the chain, and then to assemble the coated outer plates. Further, since the coated outer plates have to be switched to the other outer plates to compose the timing chain, a number of steps are required to assemble the timing chain.

Furthermore, since, after the entire surfaces of the respective outer plates have been coated, during construction of the timing chain, when the outer plates are pressed into the pins upon assembly of the timing chain, the coating is sometimes peeled off. When the coating is partly peeled off, the external appearance of the timing chain becomes worsened. When the coating is completely peeled off, the timing marks cannot be discriminated, and failure to assemble them between the members, for which the synchronous rotation is required, occurs.

SUMMARY OF THE INVENTION

The present invention has solved the aforementioned problem in a timing chain in which a plurality of links are connected and constructed endlessly by means of connecting pins, wherein to a part of a plate forming one side of a timing chain after being composed, is attached a timing mark for discriminating such plate from other plates.

The timing chain according to the present invention is produced by constructing a timing chain in which a plurality of links are assembled endlessly by means of connecting pins, after which a timing mark is imposed on a selected plate at a specific part thereof for discriminating the selected plate from other plates. The specific part to which is imposed the timing mark is the plate part that corresponds with the timing mark of the member for which synchronous rotation is required. When the timing chain, thus manufactured, is wound between the members, the members can be rotated synchronously.

The timing mark is provided by the color baking coating of a coating having a color other than the metal color of the plate material, the spray coating of the coating, the stamp of the coating, or a laser, etc. This timing mark is provided not completely but partly. Since the part of the plate on which the timing mark is provided prevents an entry of a coating between the plate and the connecting pin, a part is preferred which is not in interference with the connecting pin. Further, preferably, the part of the plate on which the timing mark is provided is between a pair of connecting pins. Since the connecting pins project from the side of the plate, even if the timing chains come in contact with each other during transportation, there is little possibility that a timing mark provided by coating is peeled off, nor that a timing mark provided by the laser will contain scratches. Also, the external appearance of the timing mark will be well maintained.

DESCRIPTION OF THE PREFERRED EMBODIMENTS OF THE INVENTION

Figure 1:
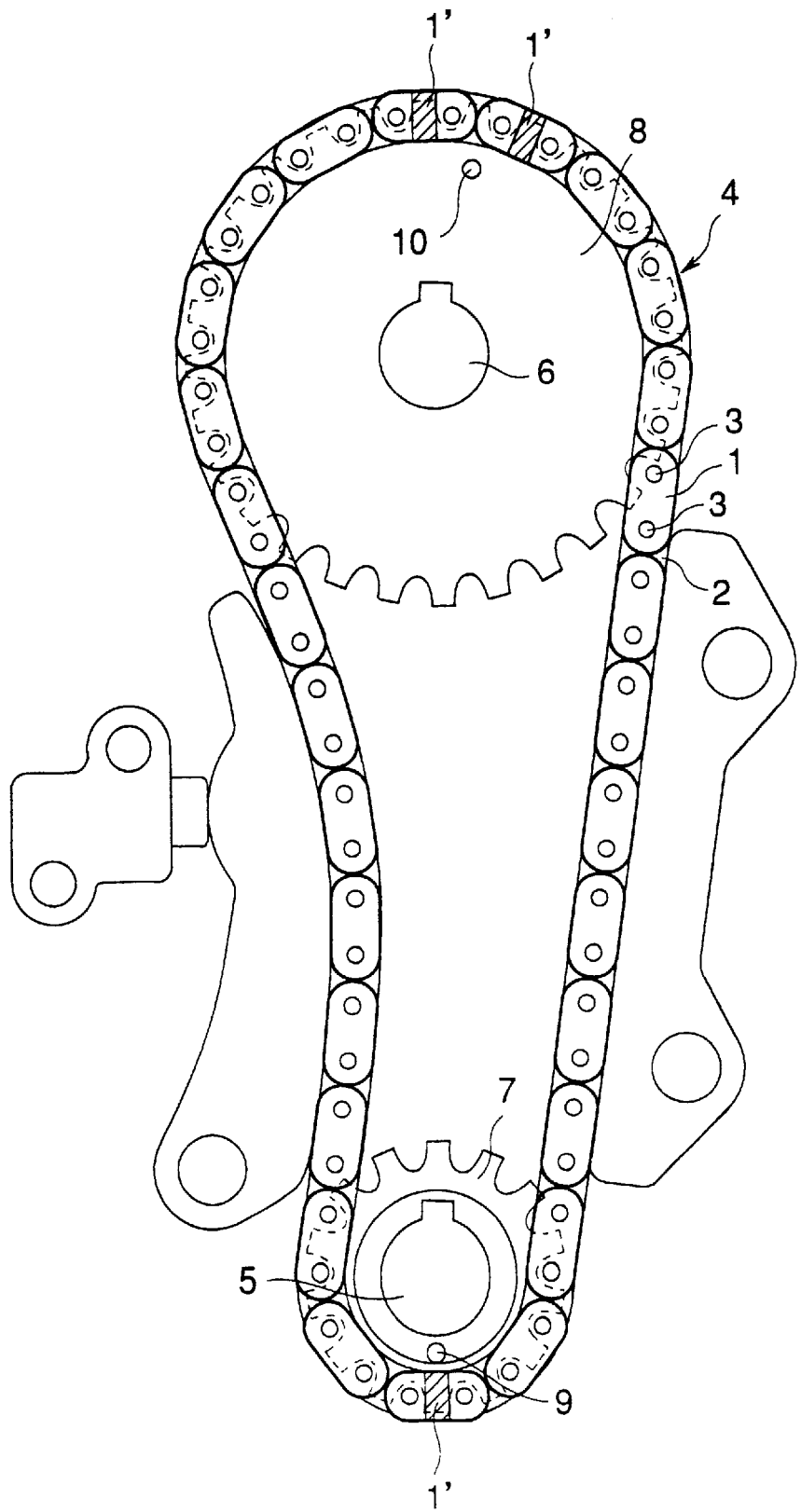
FIG. 1 is a side view showing a first embodiment of a timing chain according to the present invention.

FIG. 1 shows a first embodiment of a timing chain according to the present invention. In this embodiment, there is shown an endless timing chain 4 of a roller type in which an outer plate 1 and an inner plate 2 are connected by means of connecting pins 3. This timing chain 4 is wound between a crank sprocket 7 mounted on a crank shaft 5 and a cam sprocket 8 mounted on a cam shaft 6 in a vehicle engine. The timing chain 4 is sometimes wound between a crank shaft and another member for which synchronous rotation is required, like a balancer shaft.

In the timing chain 4 according to the present embodiment, a timing mark 1' is provided on the outer plate 1 at a specific part on one side. This specific part is a part corresponding to a timing mark 9 of the crank sprocket 7 and a timing mark 10 of the cam sprocket 8. The timing mark 1' corresponding to the timing mark 9 is provided on one outer plate 1, and the timing marks 1' corresponding to the timing mark 10 are provided on a plurality of outer plates 1, 1.

The outer plates 1 and inner plates 2 are assembled into an endless chain, after which the timing marks 1' are provided on the timing chain. The respective timing marks 1' are in the shape of a web extending from an inner edge to an outer edge between the connecting pins of the outer plate 1. Thereby, even in the case where the timing mark 1' is provided by coating, the coating is prevented from being moved to a position in and between the outer plate 1 and a connecting pin 3. Furthermore, the timing mark 1' is protected by the connecting pin 3 projecting from the surface of the outer plate 1.

In the present invention, the form of the timing mark 1' can be freely selected without increasing the number of assembling steps of the timing chain 4. That is, the form of the timing mark 1' corresponding to the timing mark 9 is made different from that of the timing marks 1' corresponding to the timing mark 10, and the timing mark 1' can be provided on one outer plate 1. For example, the timing mark 1' corresponding to the timing mark 9 is formed to be web-like and the timing mark 1' corresponding to the timing mark 10 is formed in the shape of a circle whereby one timing mark 1' can be made to correspond to the crank sprocket 7, and the other timing mark 1' can be made to correspond to the cam sprocket 8.

The timing mark 1' is made by a baked colored coating. A preferable color is a color other than a metal color and a dark color which are colors peculiar to materials used for parts of the vehicle engine. More specifically, preferred colors are colors having a high brightness and coloration such as white, yellow, pale blue, pink, green-yellow, red or the like. The timing marks may be provided by spray coating of the coating, by stamping of the coating or by laser.

Figure 2:
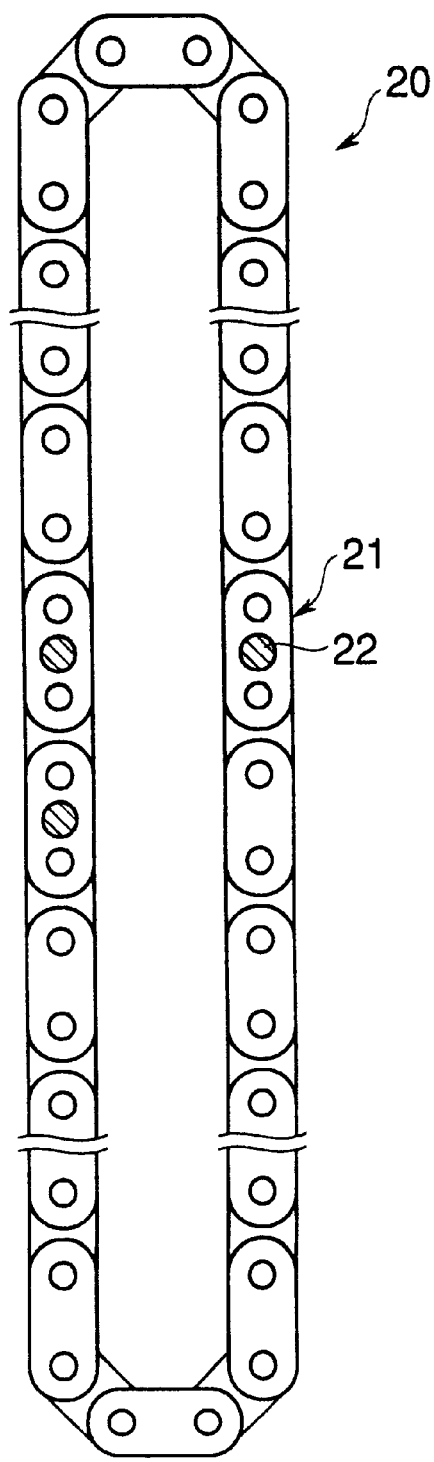
FIG. 2 is a side view showing a second embodiment of a timing chain according to the present invention.

FIG. 2 shows a second embodiment of the timing chain according to the present invention. In a timing chain 20 of the present embodiment, a circular timing mark 22 is provided on a pitch line between connecting pins, in the surface of an outer plate 21.

Figure 3:
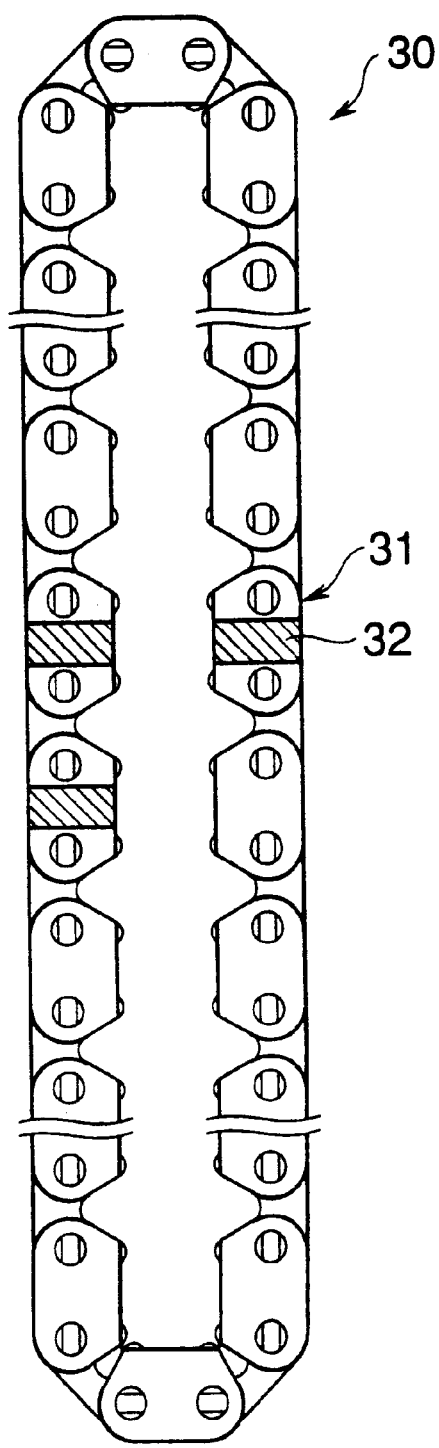
FIG. 3 is a side view showing a third embodiment of a timing chain according to the present invention.

FIG. 3 shows a third embodiment of the timing chain according to the present invention. A timing chain 30 in the present embodiment is a silent chain. There is provided a web-like timing mark 32 extending from an inner edge to an outer edge of a guide plate 31 between connecting pins, in the surface of a guide plate 31.

Figure 4:
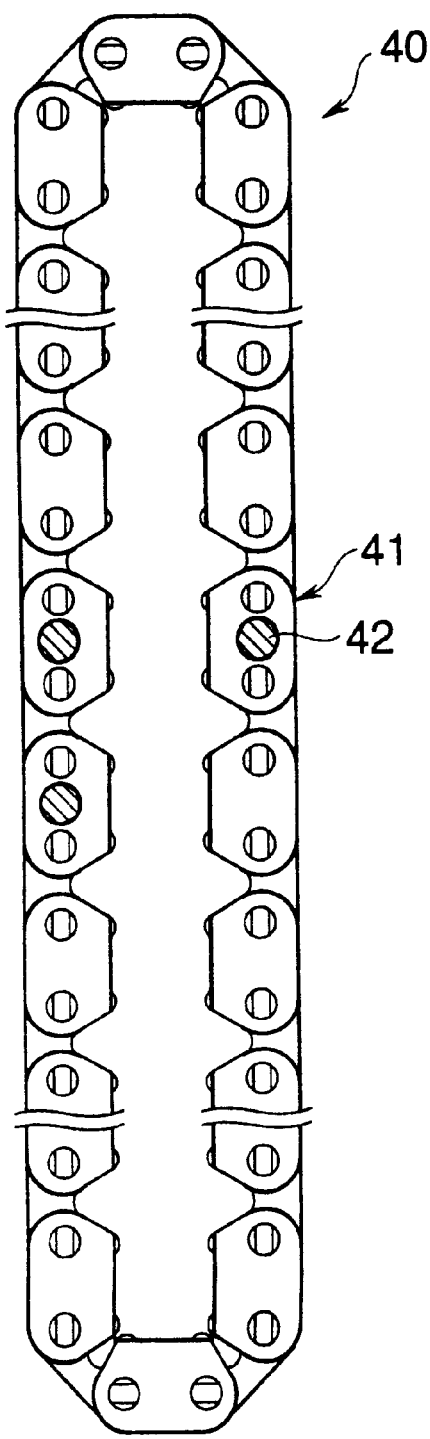
FIG. 4 is a side view showing a fourth embodiment of a timing chain according to the present invention.

FIG. 4 shows a fourth embodiment of the timing chain according to the present invention. In a timing chain 40 of the present embodiment, a circular timing mark 42 is provided on a pitch line between connecting pins, in the surface of a guide plate 41.

By means of the present invention, since the timing marks are provided on the outer plates of the timing chain after the chain is assembled, the number of the outer plates constituting the timing chain can be reduced, whereby the number of parts to be held in stock is reduced, and the number of steps for managing the parts can be considerably reduced. Further, when the timing chain is manufactured, it is also unnecessary that the outer plate having a timing mark be switched to the position of an outer plate having no timing mark for assembly.

According to the kind of timing chains and synchronous members between which the timing chain is wound, the forms of the timing marks, for example, the shape, color and mounting means of the timing marks thereof, can be suitably selected, and the number of timing marks required and the position of the timing marks to be provided can be suitably selected whereby a freedom of design of the timing chain having the timing marks is enhanced.

What is claimed is:

1. A method of manufacturing a timing chain having timing marks, comprising the steps of:

assembling a plurality of links defined by inner plates and outer plates interconnected by connecting pins into an endless chain, and thereafter imposing a timing mark at a predetermined location on at least one outer plate.

2. The method according to claim 1 in which the timing mark imposing step includes the step of applying a colored coating on said outer plate followed by baking said coating.

3. The method according to claim 2 in which said coating is applied by stamping.

4. The method according to claim 2 in which said coating is applied by laser deposition.

\* \* \* \* \*